United States Patent
Liao

(10) Patent No.: US 9,531,192 B2
(45) Date of Patent: Dec. 27, 2016

(54) POWER PROVIDING APPARATUS FOR USE WITH MULTIPLE ELECTRICITY SOURCES

(71) Applicant: CSI Technology Co., Ltd., Taichung (TW)

(72) Inventor: Chen-Sung Liao, Taichung (TW)

(73) Assignee: CSI Technology Co., Ltd., Taichung (TW)

( * ) Notice: Subject to any disclaimer, the term of this patent is extended or adjusted under 35 U.S.C. 154(b) by 414 days.

(21) Appl. No.: 14/327,012

(22) Filed: Jul. 9, 2014

(65) Prior Publication Data
US 2016/0013651 A1    Jan. 14, 2016

(51) Int. Cl.
*H02J 1/10* (2006.01)
*H02J 3/38* (2006.01)

(52) U.S. Cl.
CPC .............. *H02J 3/386* (2013.01); *H02J 3/383* (2013.01); *H02J 3/385* (2013.01); *Y02E 10/763* (2013.01)

(58) Field of Classification Search
CPC ............ H02J 3/383; H02J 3/385; H02J 3/386; Y02E 10/763

USPC ......................................... 307/43, 44, 48, 75
See application file for complete search history.

(56) References Cited

U.S. PATENT DOCUMENTS

| | | | | |
|---|---|---|---|---|
| 7,276,813 B2* | 10/2007 | Dobbs | .................. | G06F 1/26 307/65 |
| 2009/0243390 A1* | 10/2009 | Oto | .................. | H02J 7/34 307/43 |
| 2012/0175956 A1* | 7/2012 | Kitamura | .................. | H02J 1/102 307/43 |

* cited by examiner

*Primary Examiner* — Hal Kaplan
(74) *Attorney, Agent, or Firm* — Trop Pruner & Hu, P.C.

(57) ABSTRACT

A power providing apparatus includes a first input port for connection to a first electricity source, a second input port for connection to a second electricity source, an output port, a first current control component connected between the first input port and the output port, and a second current control component connected between the second input port and the output port. Based on voltages associated with the first electricity source and the second electricity source, each of the first and the second current control components makes or breaks a current path from a respective one of the first and second input ports to the output port.

16 Claims, 4 Drawing Sheets

POWER PROVIDING APPARATUS FOR USE WITH MULTIPLE ELECTRICITY SOURCES

BACKGROUND OF THE INVENTION

1. Field of the Invention

The present invention relates to a power providing apparatus configured for use with at least a first electricity source and a second electricity source.

2. Description of the Related Art

Due to environmental protection and energy consumption issues, solar power is being developed and becoming more popular. Conventionally, solar panels are used for collecting light, and convert light energy into electrical energy by photovoltaic effect.

However, the amount of electrical energy converted varies with light intensity. When the light intensity is low, an output power of the solar panels will drop, causing an unstable supply of electrical power to an electrical appliance electrically connected to the solar panels.

SUMMARY OF THE INVENTION

The object of the present invention is to provide a power providing apparatus that can be used with different electricity sources to provide stable electrical power to a load.

According to the present invention, there is provided a power providing apparatus configured for use with a first electricity source and a second electricity source, and configured to provide electric power to a load. The power providing apparatus comprises a first input port for electrical connection to the first electricity source, a second input port for electrical connection to the second electricity source, an output port for electrical connection to the load, a first current control component having an input terminal coupled electrically to the first input port, and an output terminal coupled electrically to the output port, and a second current control component having an input terminal coupled electrically to the second input port, and an output terminal coupled electrically to the output port.

When a voltage inputted to the first current control component and associated with the first electricity source is greater than a voltage inputted to the second current control component and associated with the second electricity source by a predetermined difference, the second current control component breaks a current path from the second input port to the output port, and the first current control component makes a current path from the first input port to the output port.

When absolute value of a difference between the voltage inputted to the first current control component and associated with the first electricity source and the voltage inputted to the second current control component and associated with the second electricity source is less than the predetermined difference, the second current control component makes the current path from the second input port to the output port, and the first current control component makes the current path from the first input port to the output port.

When the voltage inputted to the second current control component and associated with the second electricity source is greater than the voltage inputted to the first current control component and associated with the first electricity source by the predetermined difference, the second current control component makes the current path from the second input port to the output port, and the first current control component breaks the current path from the first input port to the output port.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
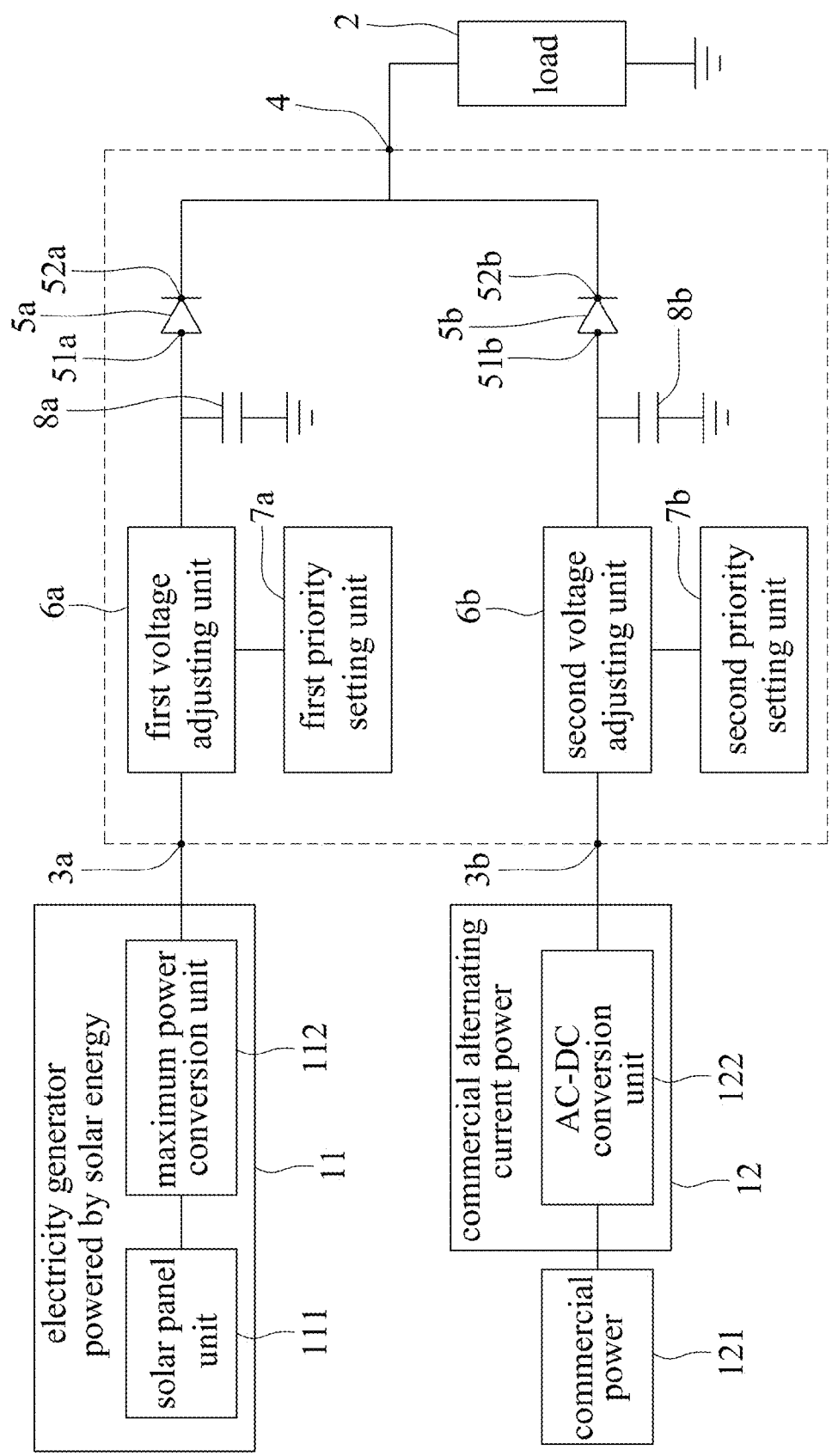
FIG. 1 is a schematic diagram of an implementation of a preferred embodiment of a power providing apparatus of the present invention.

Referring to FIG. 1, discloses a preferred embodiment of a power providing apparatus according to this invention is configured for use with an electricity generator 11 powered by solar energy (a first electricity source) and a power converter 12 powered by commercial alternating current power (a second electricity source), and is configured to provide electric power to a load 2. The power providing apparatus includes a first input port 3a, a second input port 3b, an output port 4, a first current control component 5a, a second current control component 5b, a first voltage adjusting unit 6a, a second voltage adjusting unit 6b, a first priority setting unit 7a, a second priority setting unit 7b, a first storage unit 8a, and a second storage unit 8b.

The first input port 3a and the second input port 3b are electrically connected to the electricity generator 11 and the power converter 12, respectively. The output port 4 is adapted to be electrically connected to the load 2. The electricity generator 11 includes a solar panel unit 111 and a maximum power conversion unit 112. The power converter 12 includes an alternating current-direct current (AC-DC) conversion unit 122 that receives the commercial power 121.

The first current control component 5a has an input terminal 51a coupled electrically to the first input port 3a, and an output terminal 52a coupled electrically to the output port 4. The second current control component 5b has an input terminal 51b coupled electrically to the second input port 3b, and an output terminal 52b coupled electrically to the output port 4. In this embodiment, the first current control component 5a and the second current control component 5b are diodes, and the input terminal and the output terminal of each diode is an anode and a cathode, respectively. In other embodiments, each of the first current control component 5a and the second current control component 5b is a thyristor. As an example, each of the first current control component 5a and the second current control component 5b may be a silicon controlled rectifier. In another example, each of the first current control component 5a and the second current control component 5b is a triode for alternating current (TRIAC).

The first voltage adjusting unit 6a couples electrically the first input port 3a to the input terminal 51a of the first current control component 51a, and the second voltage adjusting unit 6b couples electrically the second input port 3b to the input terminal 51b of the second current control component 52b. The first voltage adjusting unit 6a and the second voltage adjusting unit 6b can be switched between a working state and a non-working state. For instance, in the working state, the first voltage adjusting unit 6a outputs a voltage that is in the range of an operating voltage of the load 2. In the non-working state, the voltage outputted by the first voltage adjusting unit 6a varies with an input voltage received by the first voltage adjusting unit 6a.

The first priority setting unit 7a is coupled electrically to the first voltage adjusting unit 6a and is configured to control the first voltage adjusting unit 6a to switch between the working state and the non-working state. While in the working state, the first priority setting unit 7a controls the first voltage adjusting unit 6a to output a voltage to the input terminal 51a of the first current control component 5a that corresponds to a priority assigned to the electricity generator 11. Similarly, the second priority setting unit 7b is coupled electrically to the second voltage adjusting unit 6b and is configured to control the second voltage adjusting unit 6b to switch between the working state and the non-working state. While in the working state, the second priority setting unit 7b controls the second voltage adjusting unit 6b to output a voltage to the input terminal 51b of the second current control component 5b that corresponds to a priority assigned to the power converter 12.

The first storage unit 8a is coupled to the input terminal 51a of the first current control component 51a. The second storage unit 8b is coupled to the input terminal 51b of the second current control component 51b. In this embodiment, each of the first and the second storage units 8a, 8b is a capacitor.

Figure 2:
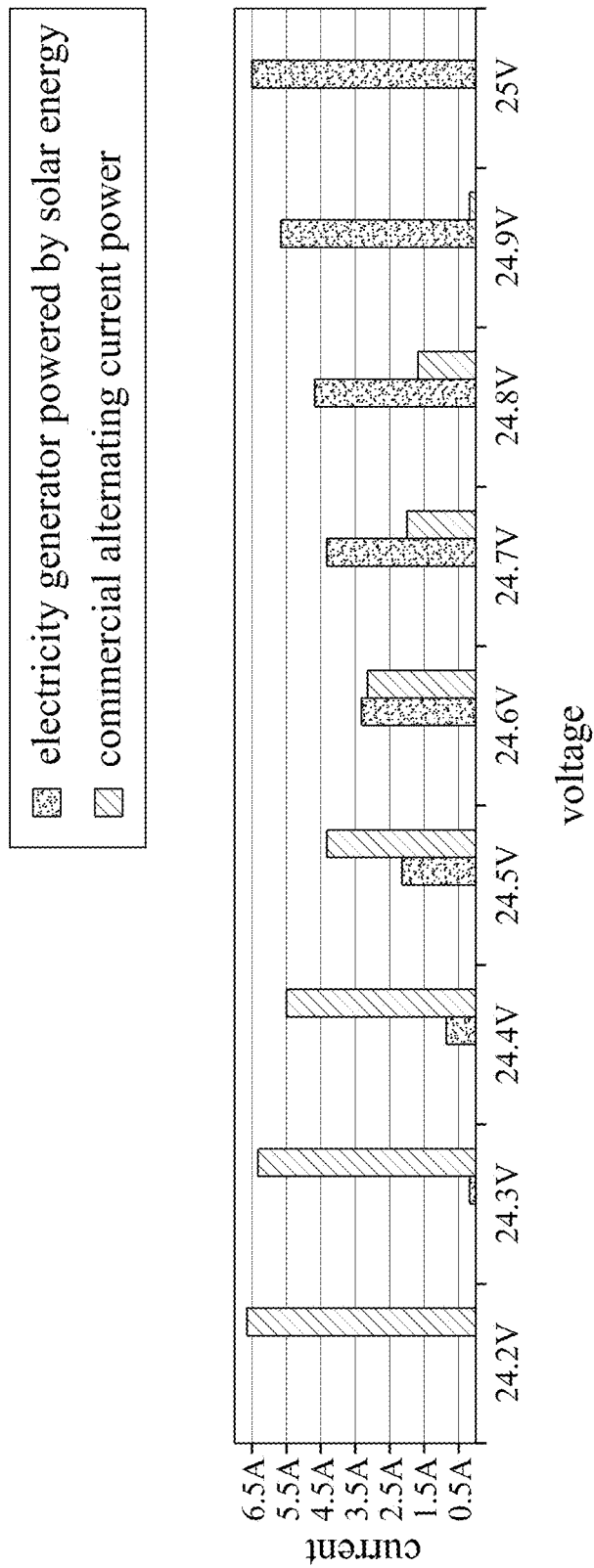
FIG. 2 is a graph illustrating voltage and current relationship in a circuit simulation of the preferred embodiment of the power providing apparatus when used with an electricity generator powered by solar energy and a power converter powered by commercial alternating current power.

Referring to FIG. 2, in the use state of the power providing apparatus, the first priority setting unit 7a switches the first voltage adjusting unit 6a electrically connected with the electricity generator 11 to be in a non-working state, and the second priority setting unit 7b switches the second voltage adjusting unit 6b electrically connected with the power converter 12 to be in a working state, such that the second voltage adjusting unit 6b outputs a voltage that is lower than a peak voltage of a voltage outputted by the first voltage adjusting unit 6a and that is in the range of the operating voltage of the load 2. In a circuit simulation of this preferred embodiment, the voltage outputted by the second voltage adjusting unit 6b is 24.6V.

When a voltage inputted to the first current control component 5a and associated with the first electricity source 11 (the electricity generator) is greater than a voltage inputted to the second current control component 5b and associated with the second electricity source 12 (the power converter) by a predetermined difference (in this embodiment, the predetermined difference is 0.4V), the first current control component 5a is forward biased with a voltage across the input terminal 51a and the output terminal 52a of the first current control component 5a that is greater than a threshold voltage, i.e. the PN junction voltage, and thus the first current control component 5a makes a current path from the first input port 3a to the output port 4. On the other hand, a voltage across the input terminal 51b and the output terminal 52b of the second current control component 5b is smaller than a threshold voltage of the second current control component 5b, and thus the second current control component 5b breaks a current path from the second input port 3b to the output port 4.

Due to changes in light received by the electricity generator 11, the voltage inputted to the first current control component 5a by the electricity generator 11 starts to decrease. When absolute value of a difference between the voltage inputted to the first current control component 5a and associated with the first electricity source 11 (the electricity generator) and the voltage inputted to the second current control component 5b and associated with the second electricity source 12 (the power converter) is less than the predetermined difference, the first current control component 5a maintains the current path from the first input port 3a to the output port 4, with the first electricity source 11 supplying a smaller amount of current to the output port 4 than before. At the same time, the voltage across the input terminal 51b and the output terminal 52b of the second current control component 5b becomes greater than the threshold voltage of the second current control component 5b, and thus the second current control component 5b makes a current path from the second input port 3b to the output port 4. As a result, both the first electricity source 11 and the second electricity source 12 supply current to the load 2. The second electricity source 12 supplies the current that supplements the drop in the current supplied by the first electricity source 11, such that power received by the load 2 is sufficient.

When the light received by the electricity generator 11 is further decreased, the voltage inputted to the second current control component 5b and associated with the second electricity source 12 (the power converter) becomes greater than the voltage inputted to the first current control component 51a and associated with the first electricity source 11 (the electricity generator) by the predetermined difference, the second current control component 5b maintains the current path from the second input port 3b to the output port 4. At the same time, the voltage across the input terminal 51a and the output terminal 52a of the first current control component 5a becomes smaller than the threshold voltage of the first current control component 5a, and thus the first current control component 51a breaks the current path from the first input port 3a to the output port 4.

Figure 3:
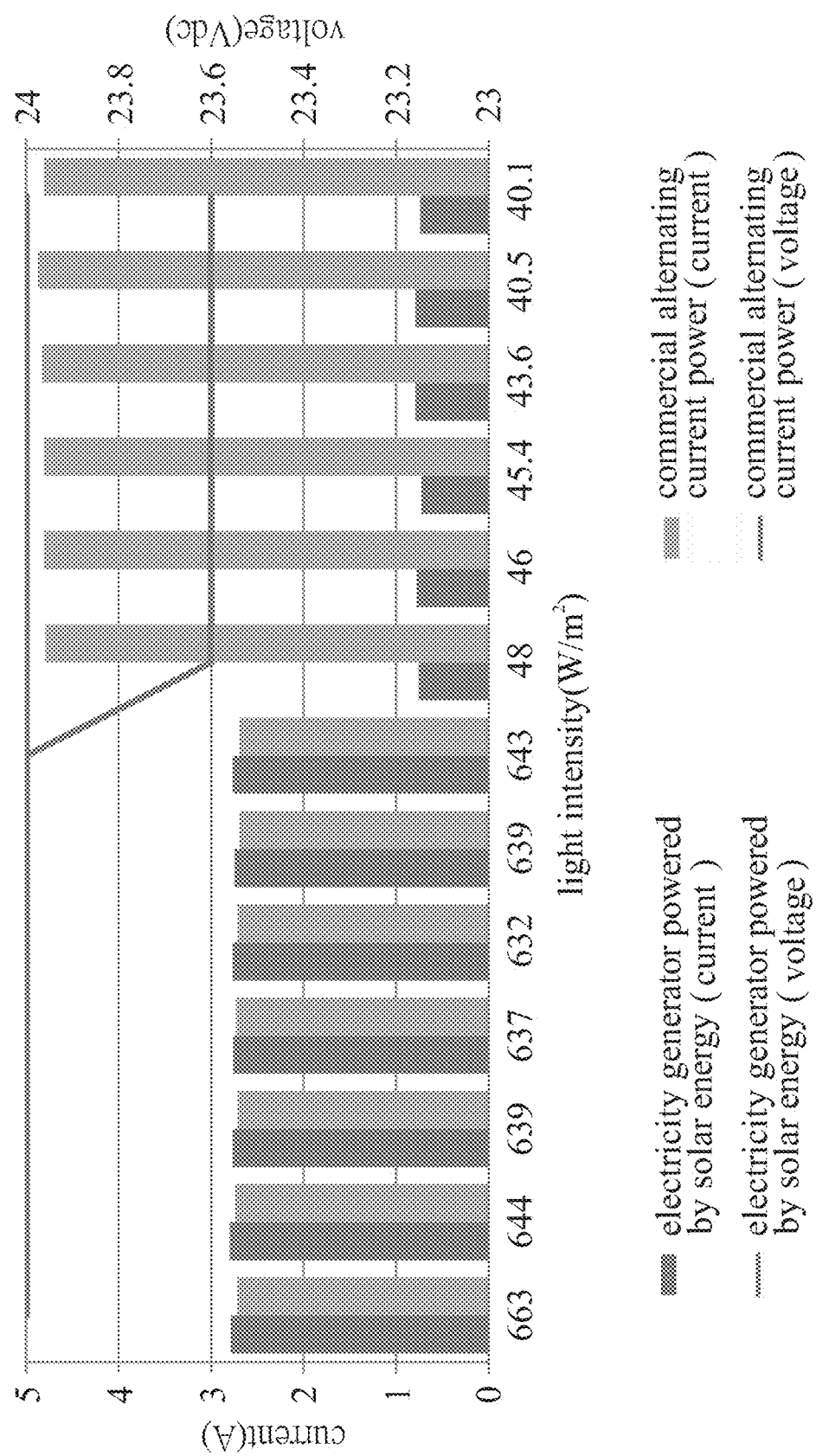
FIG. 3 is a graph illustrating changes in voltage and current, based on an experiment with the preferred embodiment of the power providing apparatus under various lighting conditions.

FIG. 3 shows a graph of electricity supplied by the power providing apparatus under different lighting conditions in an actual experiment. The operating voltage and the consumption power of the load 2 are 24V and 130 W, respectively, and thus the second voltage adjusting unit 6b is adjusted to be 24V.

Figure 4:
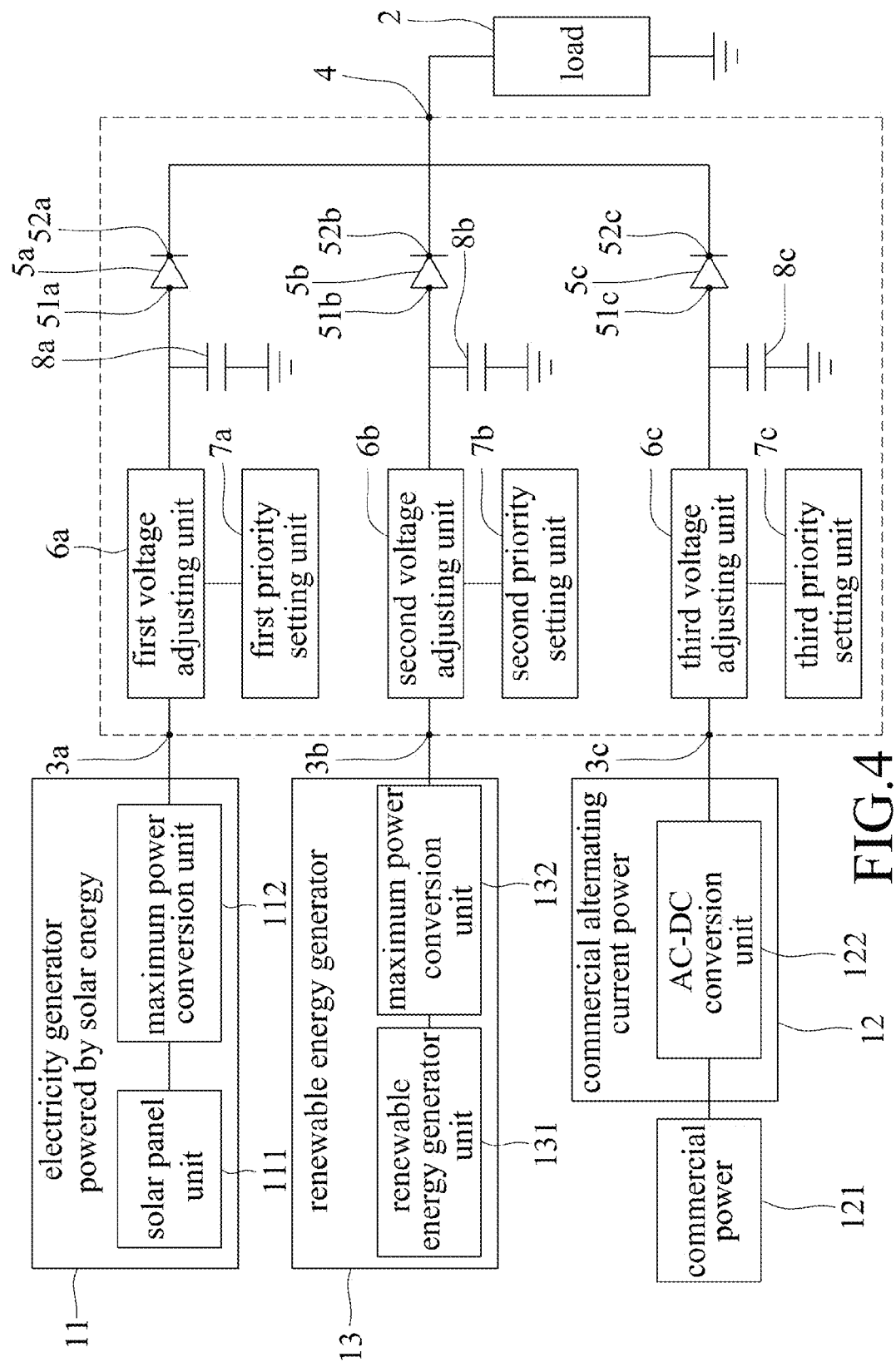
FIG. 4 is a schematic diagram of another implementation of another mode of the preferred embodiment of the power providing apparatus of the present invention.

Referring to FIG. 4, the power providing apparatus of this invention can be further configured for use with a renewable power generator 13 (second electricity source), such as a wind power generator, a geothermal power generator, a tidal power generator, a biofuel power generator, etc. The power providing apparatus is capable of regulating the supply of power from the electricity generator 11 powered by solar energy (first electricity source), the power converter 12 powered by commercial alternating current power (third electricity source), and the renewable power generator 13. The power providing apparatus further includes a third input port 3c for electrical connection to the third electricity source, a third current control component 5c having an input terminal 51c coupled electrically to the third input port 3c, and an output terminal 52c coupled electrically to the output port 4, a third voltage adjusting unit 6c that couples electrically the third input port 3c to the input terminal 51c of the third current control component 5c, a third priority setting unit 7c coupled electrically to the third voltage adjusting unit and configured to control the third voltage adjusting unit 6c so as to output a voltage to the input terminal 51c of the third current control component 5c that corresponds to a priority assigned to the third electricity source, and a third storage unit 8c electrically connected with the input terminal 51c of the third current control component 5c.

The renewable power generator 13 includes an electricity generator unit 131 powered by a sustainable energy source, and a maximum power conversion unit 132.

In the use state of the power providing apparatus, the first priority setting unit 7a switches the first voltage adjusting unit 6a electrically connected with the electricity generator 11 to be in a non-working state, the third priority setting unit 7c switches the third voltage adjusting unit 6c electrically connected with the power converter 12 to a working state, and the second priority setting unit 7b switches the second voltage adjusting unit 6b to a working state, and a voltage inputted to the second current control component 5b and associated with the renewable power generator 13 is greater than a voltage inputted to the third current control component 5c and associated with the power converter 12.

When a voltage inputted to the first current control component 5a and associated with the electricity generator 11 is greater than a voltage inputted to the second current control component 5b and associated with the renewable power generator 13 by a first predetermined difference, and is greater than a voltage inputted to the third current control component 5c and associated with the power converter 12 by a second predetermined difference, the second current control component 5b breaks a current path from the second input port 3b to the output port 4, the third current control component 5c breaks a current path from the third input port 3c to the output port 4, and the first current control component 5a makes a current path from the first input port 3a to the output port 4.

When absolute value of a difference between the voltage inputted to the first current control component 5a and associated with the electricity generator 11 and the voltage inputted to the second current control component 5b and associated with the renewable power generator 13 is less than the first predetermined difference, and the voltage inputted to the first current control component 5a and associated with the electricity generator 11 is greater than the voltage inputted to the third current control component 5c and associated with the power converter 12 by the second predetermined difference, the second current control component 5b makes the current path from the second input port 3b to the output port 4, the third current control component 5c breaks the current path from the third input port 3c to the output port 4, and the first current control component 5a makes the current path from the first input port 3a to the output port 4.

When the voltage inputted to the second current control component 5b and associated with the renewable power generator 13 is greater than the voltage inputted to the first current control component 5a and associated with the electricity generator 11 by the first predetermined difference, and the voltage inputted to the second current control component 5b and associated with the renewable power generator 13 is greater than the voltage inputted to the third current control component 5c and associated with the power converter 12 by the second predetermined difference, the second current control component 5b makes the current path from the second input port 3b to the output port 4, the third current control component 5c breaks the current path from the third input port 3c to the output port 4, and the first current control component 5a breaks the current path from the first input port 3a to the output port 4.

When the voltage inputted to the second current control component 5b and associated with the renewable power generator 13 is greater than the voltage inputted to the first current control component 5a and associated with the electricity generator 11 by the first predetermined difference, and absolute value of a difference between the voltage inputted to the second current control component 5b and associated with the renewable power generator 13 and the voltage inputted to the third current control component 5c and associated with the power converter 12 is less than the second predetermined difference, the second current control component 5b makes the current path from the second input port 3b to the output port 4, the third current control component 5c makes the current path from the third input port 3c to the output port 4, and the first current control component 5a breaks the current path from the first input port 5a to the output port 4.

When the voltage inputted to the third current control component 5c and associated with the power converter 12 is greater than the voltage inputted to the first current control component 5a and associated with the electricity generator 11 by the first predetermined difference, and is greater than the voltage inputted to the second current control component 5b and associated with the renewable power generator 13 by the second predetermined difference, the second current control component 5b breaks the current path from the second input port 3b to the output port 4, the third current control component 5c makes the current path from the third input port 3c to the output port 4, and the first current control component 5a breaks the current path from the first input port 3a to the output port 4.

In summary, the power providing apparatus of this invention automatically regulates the voltages outputted by the voltage adjusting units 6a, 6b, 6c through the priority setting units 7a, 7b, 7c. Moreover, with the current control components 5a, 5b, 5c, the power providing apparatus is able to prioritize the electricity generator 11 to provide power to the load 2. When the electricity generator 11 powered by solar energy has insufficient power, other power sources, according to an order of priority, are able to provide power to the load 2. When power of the electricity generator 11 is sufficient, the electricity generator 11 will once again provide power to the load 2. Therefore, without requiring an additional voltage or current detector for monitoring a power status of the electricity generator 11, the electricity generator 11 can be prioritized over other energy sources in supplying power. Since the power providing apparatus has a simple circuit design, additional energy sources can be electrically connected in parallel by adding additional current control components, voltage adjusting units, priority setting units, and storage units. Moreover, according to implementation cost of different energy sources, the priority setting units are able to prioritize energy sources in supplying electricity to the load, such that operating costs can be minimized.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A power providing apparatus configured for use with a first electricity source and a second electricity source, and configured to provide electric power to a load, the power providing apparatus comprising:
- a first input port for electrical connection to the first electricity source;
- a second input port for electrical connection to the second electricity source;
- an output port for electrical connection to the load;
- a first current control component having an input terminal coupled electrically to the first input port, and an output terminal coupled electrically to the output port; and
- a second current control component having an input terminal coupled electrically to the second input port, and an output terminal coupled electrically to the output port;

wherein:
- when a voltage inputted to the first current control component and associated with the first electricity source is greater than a voltage inputted to the second current control component and associated with the second electricity source by a predetermined difference, the second current control component breaks a current path from the second input port to the output port, and the first current control component makes a current path from the first input port to the output port;
- when absolute value of a difference between the voltage inputted to the first current control component and associated with the first electricity source and the voltage inputted to the second current control component and associated with the second electricity source is less than the predetermined difference, the second current control component makes the current path from the second input port to the output port, and the first current control component makes the current path from the first input port to the output port; and
- when the voltage inputted to the second current control component and associated with the second electricity source is greater than the voltage inputted to the first current control component and associated with the first electricity source by the predetermined difference, the second current control component makes the current path from the second input port to the output port, and the first current control component breaks the current path from the first input port to the output port.

2. The power providing apparatus as claimed in claim 1, wherein each of the first current control component and the second current control component is a diode.

3. The power providing apparatus as claimed in claim 1, wherein each of the first current control component and the second current control component is a thyristor.

4. The power providing apparatus as claimed in claim 3, wherein the thyristor is a silicon controlled rectifier.

5. The power providing apparatus as claimed in claim 3, wherein the thyristor is a triac.

6. The power providing apparatus as claimed in claim 1, further comprising:
- a first voltage adjusting unit that couples electrically the first input port to the input terminal of the first current control component; and
- a second voltage adjusting unit that couples electrically the second input port to the input terminal of the second current control component.

7. The power providing apparatus as claimed in claim 6, further comprising:
- a first priority setting unit coupled electrically to the first voltage adjusting unit and configured to control the first voltage adjusting unit so as to output a voltage to the input terminal of the first current control component that corresponds to a priority assigned to the first electricity source; and
- a second priority setting unit coupled electrically to the second voltage adjusting unit and configured to control the second voltage adjusting unit so as to output a voltage to the input terminal of the second current control component that corresponds to a priority assigned to the second electricity source.

8. The power providing apparatus as claimed in claim 7, wherein the first electricity source has a higher priority than the second electricity source, and the second priority setting unit is configured to control the second voltage adjusting unit so that the voltage outputted by the second voltage adjusting unit is lower than a peak voltage of the voltage outputted by the first voltage adjusting unit.

9. The power providing apparatus as claimed in claim 8, wherein the first electricity source is an electricity generator powered by solar energy, and the second electricity source is a power converter powered by commercial alternating current power.

10. The power providing apparatus as claimed in claim 1, further comprising at least one storage unit, each coupled to the input terminal of a corresponding one of the first current control component and the second current control component.

11. The power providing apparatus as claimed in claim 10, wherein the storage unit is a capacitor.

12. A power providing apparatus configured for use with a first electricity source, a second electricity source and a third electricity source, and con figured to provide electric power to a load, the power providing apparatus comprising:
- a first input port for electrical connection to the first electricity source;
- a second input port for electrical connection to the second electricity source;
- a third input port for electrical connection to the third electricity source;
- an output port for electrical connection to the load;
- a first current control component having an input terminal coupled electrically to the first input port, and an output terminal coupled electrically to the output port;
- a second current control component having an input terminal coupled electrically to the second input port, and an output terminal coupled electrically to the output port; and
- a third current control component having an input terminal coupled electrically to the third input port, and an output terminal coupled electrically to the output port;

wherein:
- when a voltage inputted to the first current control component and associated with the first electricity source is greater than a voltage inputted to the second current control component and associated with the second electricity source by a first predetermined difference, and is greater than a voltage inputted to the third current control component and associated with the third electricity source by a second predetermined difference, the second current control component breaks a current path from the second input port to the output port, the third current control component breaks a current path from the third input port to the output port, and the first current control component makes a current path from the first input port to the output port;
- when absolute value of a difference between the voltage inputted to the first current control component and associated with the first electricity source and the voltage inputted to the second current control component and associated with the second electricity source is less than the first predetermined difference, and the voltage inputted to the first current control component and associated with the first electricity source is greater than the voltage inputted to the third current control component and associated with the third electricity source by the second predetermined difference, the second current control component makes the current path from the second input port to the output port, the third current control component breaks the current path from the third input port to the output port, and the first current control component makes the current path from the first input port to the output port;

when the voltage inputted to the second current control component and associated with the second electricity source is greater than the voltage inputted to the first current control component and associated with the first electricity source by the first predetermined difference, and the voltage inputted to the second current control component and associated with the second electricity source is greater than the voltage inputted to the third current control component and associated with the third electricity source by the second predetermined difference, the second current control component makes the current path from the second input port to the output port, the third current control component breaks the current path from the third input port to the output port, and the first current control component breaks the current path from the first input port to the output port;

when the voltage inputted to the second current control component and associated with the second electricity source is greater than the voltage inputted to the first current control component and associated with the first electricity source by the first predetermined difference, and absolute value of a difference between the voltage inputted to the second current control component and associated with the second electricity source and the voltage inputted to the third current control component and associated with the third electricity source is less than the second predetermined difference, the second current control component makes the current path from the second input port to the output port, the third current control component makes the current path from the third input port to the output port, and the first current control component breaks the current path from the first input port to the output port; and when the voltage inputted to the third current control component and associated with the third electricity source is greater than the voltage inputted to the first current control component and associated with the first electricity source by the first predetermined difference, and is greater than the voltage inputted to the second current control component and associated with the second electricity source by the second predetermined difference, the second current control component breaks the current path from the second input port to the output port, the third current control component makes the current path from the third input port to the output port, and the first current control component breaks the current path from the first input port to the output port.

13. The power providing apparatus as claimed in claim 12, further comprising:
a first voltage adjusting unit that couples electrically the first input port to the input terminal of the first current control component;
a second voltage adjusting unit that couples electrically the second input port to the input terminal of the second current control component; and
a third voltage adjusting unit that couples electrically the third input port to the input terminal of the third current control component.

14. The power providing apparatus as claimed in claim 13, further comprising:
a first priority setting unit coupled electrically to the first voltage adjusting unit and configured to control the first voltage adjusting unit so as to output a voltage to the input terminal of the first current control component that corresponds to a priority assigned to the first electricity source;
a second priority setting unit coupled electrically to the second voltage adjusting unit and configured to control the second voltage adjusting unit so as to output a voltage to the input terminal of the second current control component that corresponds to a priority assigned to the second electricity source; and
a third priority setting unit coupled electrically to the third voltage adjusting unit and configured to control the third voltage adjusting unit so as to output a voltage to the input terminal of the third current control component that corresponds to a priority assigned to the third electricity source.

15. The power providing apparatus as claimed in claim 14, wherein the first electricity source has a higher priority than the second electricity source, the second electricity source has a higher priority than the third electricity source, the third priority setting unit is configured to control the third voltage adjusting unit so that the voltage outputted by the third voltage adjusting unit is lower than a peak voltage of the voltage outputted by the second voltage adjusting unit, and the second priority setting unit is configured to control the second voltage adjusting unit so that the voltage outputted by the second voltage adjusting unit is lower than a peak voltage of the voltage outputted by the first voltage adjusting unit.

16. The power providing apparatus as claimed in claim 15, wherein:
the first electricity source is an electricity generator powered by solar energy;
the second electricity source is an electricity generator powered by a sustainable energy source selected from wind energy, geothermal energy, tidal energy, and biofuel; and
the third electricity source is a power converter powered by commercial alternating current power.

* * * * *